United States Patent
Tun et al.

(10) Patent No.: US 9,609,040 B2
(45) Date of Patent: Mar. 28, 2017

(54) EFFICIENT BITRATE ADAPTATION IN VIDEO COMMUNICATIONS OVER IP NETWORKS

(71) Applicants: Myo Tun, Randolph, NJ (US); Kyeong Ho Yang, Freehold, NJ (US)

(72) Inventors: Myo Tun, Randolph, NJ (US); Kyeong Ho Yang, Freehold, NJ (US)

(73) Assignee: Dialogic Corporation, Montreal (CA)

( * ) Notice: Subject to any disclaimer, the term of this patent is extended or adjusted under 35 U.S.C. 154(b) by 400 days.

(21) Appl. No.: 14/186,205

(22) Filed: Feb. 21, 2014

(65) Prior Publication Data

US 2015/0244760 A1    Aug. 27, 2015

(51) Int. Cl.
| | |
|---|---|
| *H04L 29/06* | (2006.01) |
| *H04N 21/438* | (2011.01) |
| *H04N 21/442* | (2011.01) |
| *H04N 21/6437* | (2011.01) |
| *H04N 21/658* | (2011.01) |

(52) U.S. Cl.
CPC ........ *H04L 65/608* (2013.01); *H04L 65/4084* (2013.01); *H04L 65/80* (2013.01); *H04N 21/438* (2013.01); *H04N 21/44209* (2013.01); *H04N 21/6437* (2013.01); *H04N 21/6582* (2013.01)

(58) Field of Classification Search
CPC .................................................. H04L 65/608
USPC ......................................................... 709/223
See application file for complete search history.

(56) References Cited

U.S. PATENT DOCUMENTS

| | | | |
|---|---|---|---|
| 2006/0018257 A1* | 1/2006 | Seo ........................ | H04L 1/0002 370/232 |
| 2010/0121974 A1* | 5/2010 | Einarsson ............... | H04L 47/10 709/231 |

OTHER PUBLICATIONS

Abu Zafar M. Shahriar, et al., A Sender-based TFRC for Saratoga: A Rate Control Mechanism for a Space-Friendly Transfer Protocol, IEEEAC Paper #1444, Version 4, Updated Jan. 2, 2011.
J. Ott, et al., Extended RTP Profile for Real-time Transport Control Protocol (RTCP)-Based Feedback (RTP/AVPF), Jul. 2006.
Thomas Wiegand, et al., Overview of the H.264/AVC Video Coding Standard, IEEE Transactions on Circuits and System for Video Technology, vol. 13, No. 7, Jul. 2003.

(Continued)

*Primary Examiner* — David Lazaro
*Assistant Examiner* — Zia Khurshid
(74) *Attorney, Agent, or Firm* — Chapin IP Law, LLC

(57) ABSTRACT

Systems and methods of dynamically adapting multimedia data transmit rates of data senders to available bandwidths of data receivers, in which the available bandwidths are estimated by the data senders using at least reception quality feedback information provided in real-time transport control protocol (RTCP) report packets. The data senders can obtain several bandwidth estimation parameters, such as a packet loss ratio and a round trip delay, from the reception quality feedback information, as well as multimedia data transmit rates from the data senders to the data receivers, and obtain estimates of the available bandwidths of the data receivers using at least the bandwidth estimation parameters and multimedia data transmit rates. Further, using the estimated available bandwidth, the data senders can dynamically adapt the multimedia data transmit rates to the available bandwidths for more reliably achieving the quality of experience (QoE) desired and/or required for multimedia data transmissions.

43 Claims, 9 Drawing Sheets

(56) References Cited

OTHER PUBLICATIONS

Naoki Wakamiya, et al., MPEG-4 Video Transfer with TCP-friendly Rate Control, 2001.
"NETEM—Network Emulator": http://www.linuxfoundation.org/collaborate/workgroups/networking/netem, Nov. 19, 2009.
H. Alvestrand, RTCP message for Receiver Estimated Maximum Bitrate, draft-alvestrand-rmcat-remb-03, Google, Network Working Group, Oct. 21, 2013.
H. Schulzrinne, et al., RTP: A Transport Protocol for Real-Time Applications, Jul. 2003.
P. Westin, et al., RTP Payload Format for VP8 Video, draft-iet-payload-vp8-10, Google, Payload Working Group, Oct. 4, 2013.

* cited by examiner

EFFICIENT BITRATE ADAPTATION IN VIDEO COMMUNICATIONS OVER IP NETWORKS

TECHNICAL FIELD

The present application relates generally to systems and methods of multimedia communications that employ the real-time transport protocol (RTP) and the real-time transport control protocol (RTCP), and more specifically to systems and methods of dynamically adapting multimedia data transmit rates of data senders to available bandwidths of data receivers, in which the available bandwidths of the data receivers can be estimated by the data senders using at least reception quality feedback information provided in one or more RTCP report packets.

BACKGROUND

In recent years, multimedia communications over the Internet and other wired and/or wireless communications networks have gained increased popularity. For example, such multimedia communications can be performed within the context of video conferencing systems, in which multipoint control units (MCUs) are employed to facilitate collaboration among groups of conference participant devices by performing various functions including mixing, synchronizing, encoding, decoding, and transcoding video and/or audio data bitstreams generated by the respective conference participant devices.

In such video conferencing systems, successful transmissions of multimedia data from the MCUs (also referred to herein as the "data senders") to the conference participant devices (also referred to herein as the "data receivers") over communications networks generally require sufficient bandwidth and low latency for minimal packet loss. Such transmissions of multimedia data from the data senders are typically based on the real-time transport protocol (RTP), and delivery of such multimedia data to the data receivers is typically monitored using the real-time transport control protocol (RTCP). For example, a data receiver that receives multimedia data in the form of RTP packets from a data sender can provide reception quality feedback information to the data sender in one or more RTCP report packets.

Multimedia communications can be problematic, however, particularly when transmissions of multimedia data are performed over communications networks such as the Internet. For example, when video conferencing is performed over the Internet, various conference participant devices may be subjected to different levels of network congestion, which can result in reduced bandwidth, increased latency, and ultimately increased packet losses, which can severely degrade the multimedia quality of experience (QoE) for conference participants. Moreover, conventional approaches that employ RTCP report packets for monitoring the delivery of multimedia data have heretofore been incapable of reliably achieving the QoE generally desired and/or required for multimedia data transmissions.

SUMMARY

In accordance with the present application, systems and methods of dynamically adapting multimedia data transmit rates of data senders to available bandwidths of data receivers are disclosed, in which the available bandwidths of the data receivers are estimated by the data senders using at least reception quality feedback information provided in real-time transport control protocol (RTCP) report packets. In the disclosed systems and methods, the data senders can calculate, determine, or otherwise obtain several bandwidth estimation parameters, such as a packet loss ratio and a round trip delay, from the reception quality feedback information, as well as multimedia data transmit rates from the data senders to the data receivers, and calculate, determine, or otherwise obtain estimates of the available bandwidths of the data receivers, using at least the bandwidth estimation parameters and multimedia data transmit rates. Further, using the estimates of the available bandwidths of the data receivers, the data senders can dynamically adapt the multimedia data transmit rates to the estimated available bandwidths for more reliably achieving the quality of experience (QoE) desired and/or required for multimedia data transmissions.

In one aspect, a system for dynamically adapting multimedia data transmit rates of data senders to available bandwidths of data receivers includes a data sender communicably coupleable to one or more data receivers over at least one communications network. For example, the system may be a video conferencing system or any other suitable multimedia communications system. Further, the data sender may be a multipoint control unit (MCU) or any other suitable multimedia communications server or client, and the data receivers may be conference participant devices or any other suitable multimedia communications clients or servers. In an exemplary aspect, the data sender includes a video encoder, a packetizer, a network component for obtaining estimates of the available bandwidths of the respective data receivers, and a bitrate controller. In a further exemplary aspect, the network component includes a packet transmitter, a packet receiver, and a bandwidth estimator. The system is operative to perform transmissions of multimedia data based on the real-time transport protocol (RTP), and to monitor delivery of such multimedia data using the RTCP. For example, the data sender can send such multimedia data to a respective data receiver in the form of RTP packets (e.g., video, audio, and/or data RTP packets), and the respective data receiver can provide reception quality feedback information to the data sender in the form of RTCP report packets (e.g., RTCP sender report (SR) packets, RTCP receiver report (RR) packets).

Having sent one or more RTP packets to a respective data receiver, the data sender can receive, at the packet receiver, one or more RTCP report packets containing reception quality feedback information, including packet loss and round trip delay information, from the respective data receiver. In an exemplary aspect, the packet receiver includes an RTCP report packet decoder for decoding the RTCP report packets containing the reception quality feedback information, and a circular buffer for storing a history of such reception quality feedback information provided in the RTCP report packets. For example, such RTCP report packets can be RTCP SR packets, and the reception quality feedback information contained in the RTCP SR packets can include the fraction lost, the cumulative number of packets lost, the extended highest sequence number received, the last SR timestamp, and the delay since last SR. Such reception quality feedback information is defined in *RTP: A Transport Protocol for Real-Time Applications*, copyright © The Internet Society, July 2003 (the "RTP document"). It is noted that the RTP document defines the fraction lost as the number of packets lost divided by the number of packets expected. The circular buffer includes a plurality of buffers for storing the history of reception quality feedback information, including a current buffer for storing reception quality feedback information provided in an RTCP report packet most recently received at the data sender, and a series of additional buffers for storing reception quality feedback information provided in one or more RTCP report packets previously received at the data sender.

In another exemplary aspect, the packet receiver further includes a bandwidth estimation parameter calculator, and the packet transmitter includes a multimedia data transmit rate calculator. The bandwidth estimation parameter calculator is operative to calculate several bandwidth estimation parameters from the reception quality feedback information stored in the circular buffer. For example, the bandwidth estimation parameters can include a packet loss ratio, and a round trip delay between the data sender and the respective data receiver. The bandwidth estimation parameter calculator is further operative to calculate a weighted average value of the packet loss ratio, and a weighted average value of the round trip delay. The multimedia data transmit rate calculator is operative to calculate a multimedia data transmit rate used to send the RTP packets to the data receiver, and to subsequently calculate a weighted average value of the multimedia data transmit rate. For example, the multimedia data transmit rate can correspond to a video data transmit rate from the data sender to the data receiver. The bandwidth estimation parameter calculator and the multimedia data transmit rate calculator are operative to provide the bandwidth estimation parameters and the video data transmit rate, respectively, to the bandwidth estimator for use in obtaining an estimate of the available bandwidth of the data receiver.

In an exemplary mode of operation, the data sender sends, via the packet transmitter, a plurality of RTP packets to a respective data receiver, and the data sender subsequently receives, at the packet receiver, a plurality of RTCP report packets containing reception quality feedback information, such as packet loss and round trip delay information, from the respective data receiver. The RTCP report packet decoder decodes the RTCP report packets, and stores a history of the reception quality feedback information provided in the RTCP report packets in the circular buffer. Using the reception quality feedback information stored in the circular buffer, the bandwidth estimation parameter calculator calculates a plurality of bandwidth estimation parameters, including at least a packet loss ratio, a weighted average value of the packet loss ratio, a round trip delay, and a weighted average value of the round trip delay. Further, the bandwidth estimation parameter calculator determines at least whether the number of packets expected is greater than a predetermined minimum number of packets, and whether a reception interval of the RTCP report packets from the data receiver (also referred to herein as the "RTCP reception interval") is greater than a predetermined minimum time duration, but less than about twice the predetermined minimum time duration. In the event the number of packets expected is determined to be greater than the predetermined minimum number of packets, the multimedia data transmit rate calculator calculates a video data transmit rate corresponding to the RTCP reception interval. In the event the RTCP reception interval is determined to be greater than the predetermined minimum time duration, but less than about twice the predetermined minimum time duration, the bandwidth estimator proceeds toward obtaining an estimate of the available bandwidth of the data receiver, using the bandwidth estimation parameters calculated by the bandwidth estimation parameter calculator, as well as the video data transmit rate calculated by the multimedia data transmit rate calculator.

However, if the RTCP reception interval is determined to be greater than about twice the predetermined minimum time duration, then the packet receiver distributes the reception quality feedback information provided in the RTCP report packets among a plurality of buffers within the circular buffer, so as to assure that the weighted average values of the packet loss ratio and round trip delay are calculated by the bandwidth estimation parameter calculator using approximately the same quantity of reception quality feedback information. Further, the bandwidth estimation parameter calculator sets the RTCP reception interval to the predetermined minimum time duration. The bandwidth estimator then proceeds toward obtaining the estimate of the available bandwidth of the data receiver using the calculated bandwidth estimation parameters, as well as the calculated video data transmit rate.

Upon proceeding toward obtaining the estimate of the available bandwidth of the respective data receiver, the bandwidth estimator detects or otherwise determines whether there was any packet loss that was due to a limitation in the available bandwidth of the respective data receiver. For example, such a determination of packet loss can be made by determining whether the weighted average value of the round trip delay is greater than about twice the average round trip delay, and/or determining whether the average packet loss ratio is greater than a predetermined packet loss ratio. In the event such packet loss is determined to be due to the limited available bandwidth of the data receiver, the bandwidth estimator reduces the weighted average value of the video data transmit rate by an amount proportional to the weighted average value of the packet loss ratio in order to ultimately obtain a reduced estimate of the available bandwidth of the data receiver. Otherwise, if such packet loss is determined not to be due to the limited available bandwidth of the data receiver, then the bandwidth estimator increases the estimate of the available bandwidth of the data receiver by a first predetermined factor, taking into account whether or not there were no packet losses for more than a predetermined time period, and/or whether or not the weighted average value of the video data transmit rate is greater than a predetermined percentage of a prior estimate of the available bandwidth of the data receiver. In this way, the data sender can increase the video data transmit rate so as to promptly enhance the multimedia QoE as channel conditions from the data sender to the data receiver improve.

Moreover, in order to more adaptively increase the estimate of the available bandwidth of the respective data receiver, the bandwidth estimator can increase the estimate of the available bandwidth by a second predetermined factor, taking into account a current estimate of the available bandwidth of the respective data receiver, a predetermined video data transmit rate for achieving an acceptable multimedia QoE, and/or a prior video data transmit rate for which there were no packet losses.

Having obtained the estimate of the available bandwidth of the respective data receiver, the bandwidth estimator can adjust the available bandwidth estimate based at least on a current video data transmit rate, and/or whether there were any packet losses, as indicated by the reception quality feedback information stored in the circular buffer. The bandwidth estimator can also compare a value of the adjusted available bandwidth estimate with a value of the receiver estimated maximum bitrate (also referred to herein as the "REMB Bitrate"), as defined in *RTCP message for Receiver Estimated Maximum Bitrate*, copyright © 2013 IETF Trust and the persons identified as the document authors, and use the lesser of these two values as the estimate of the available bandwidth of the data receiver. The bandwidth estimator can then provide the estimate of the available bandwidth of the data receiver to the bitrate controller.

Once the estimate of the available bandwidth of the respective data receiver is received at the bitrate controller, the bitrate controller determines whether the available bandwidth estimate corresponds to a target bitrate that is within about ±5% of a current target bitrate of the video encoder. In the event the target bitrate is within about ±5% of the current target bitrate of the video encoder, the target bitrate of the video encoder remains unchanged. Otherwise, if the target bitrate is not within ±5% of the current target bitrate of the video encoder, then the bitrate controller sets the target bitrate of the video encoder so as not to exceed the available bandwidth estimate of the data receiver. Using the target bitrate set by the bitrate controller, the video encoder encodes a multimedia data bitstream, and provides the encoded multimedia data bitstream to the packetizer. The packetizer, in turn, provides corresponding RTP packets to the packet transmitter for subsequent transmission to the data receiver at a video data transmit rate commensurate with the target bitrate of the video encoder.

By obtaining, at a data sender, an estimate of an available bandwidth of a data receiver using bandwidth estimation parameters such as a packet loss ratio and a round trip delay, as well as a multimedia data transmit rate from the data sender to the data receiver, and using the obtained estimate to dynamically adapt the multimedia data transmit rate to the available bandwidth of the data receiver, an enhanced QoE can be advantageously achieved for multimedia data transmissions.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

Systems and methods of dynamically adapting multimedia data transmit rates of data senders to available bandwidths of data receivers are disclosed, in which the available bandwidths of the data receivers are estimated by the data senders using at least reception quality feedback information provided in real-time transport control protocol (RTCP) report packets. In the disclosed systems and methods, the data senders can obtain several bandwidth estimation parameters, such as a packet loss ratio and a round trip delay, from the reception quality feedback information, as well as multimedia data transmit rates from the data senders to the data receivers, and obtain estimates of the available bandwidths of the data receivers using at least the bandwidth estimation parameters and multimedia data transmit rates. Further, using the estimates of the available bandwidths of the data receivers, the data senders can dynamically adapt the multimedia data transmit rates to the estimated available bandwidths for more reliably achieving the quality of experience (QoE) desired and/or required for multimedia data transmissions.

Figure 1:
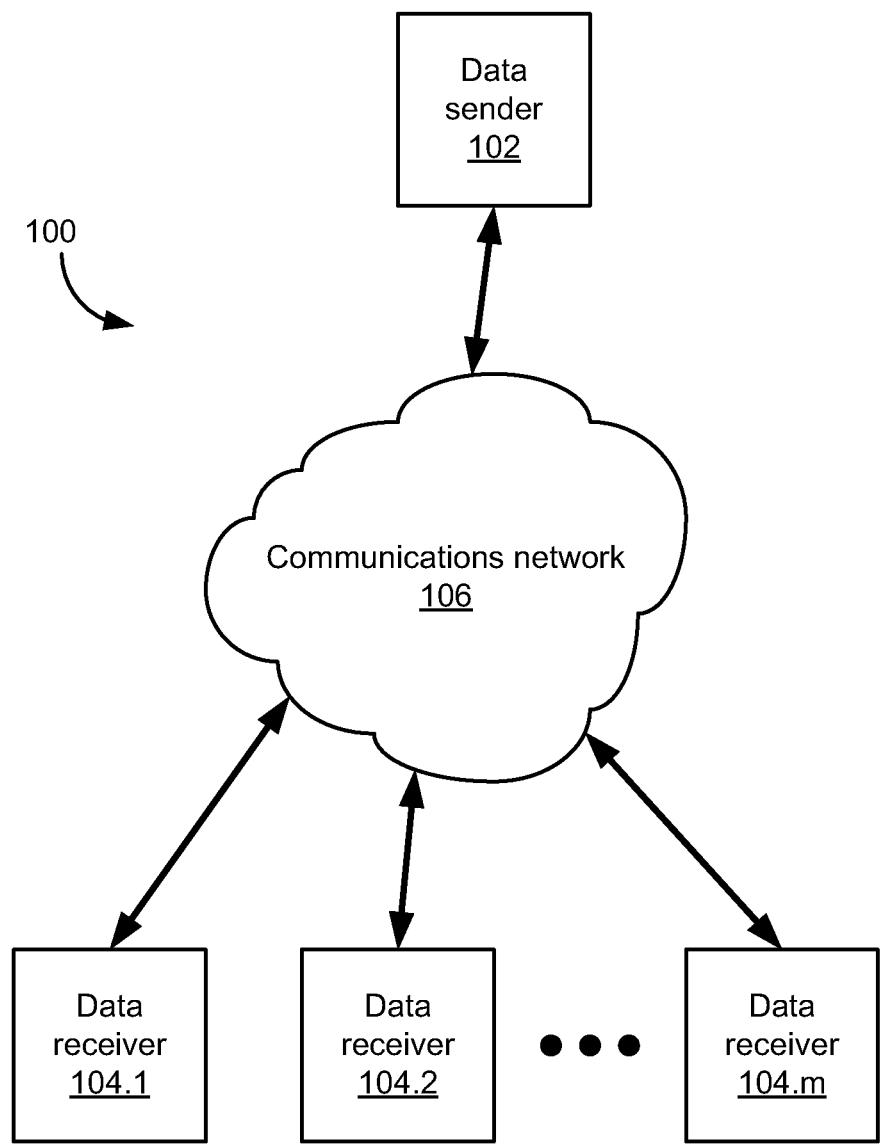
FIG. 1 is a block diagram of an exemplary communications system, including an exemplary multimedia data sender communicably coupleable to one or more exemplary multimedia data receivers over an exemplary communications network, in accordance with the present application.

FIG. 1 depicts an illustrative embodiment of an exemplary system 100 for dynamically adapting multimedia data transmit rates of data senders to available bandwidths of data receivers, in accordance with the present application. As shown in FIG. 1, the system 100 includes a data sender 102 communicably coupleable to one or more data receivers 104.1-104.m over at least one communications network 106. For example, the system 100 may be a video conferencing system, or any other suitable multimedia communications system. Further, the data sender 102 may be a multipoint control unit (MCU) or any other suitable multimedia communications server or client, and the data receivers 104.1-104.m (which, in accordance with the present application, may vary in total number) may be conference participant devices or any other suitable multimedia communications clients or servers.

Figure 2:
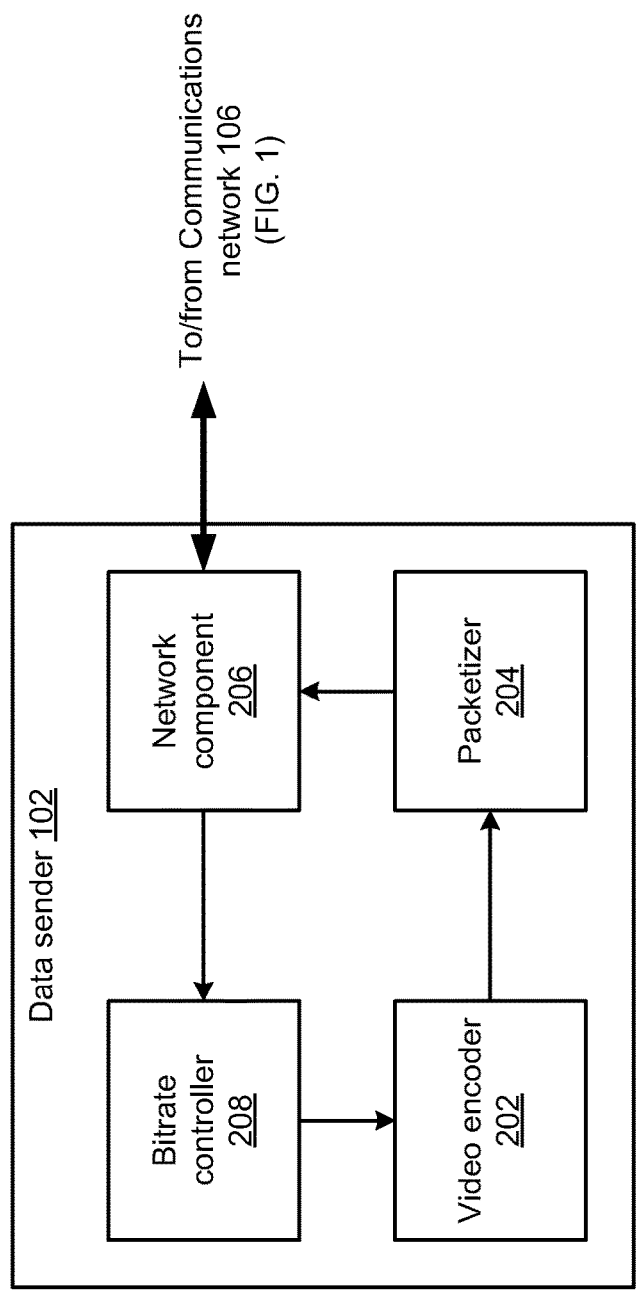
FIG. 2 is a block diagram of the multimedia data sender of FIG. 1.
Figure 3:
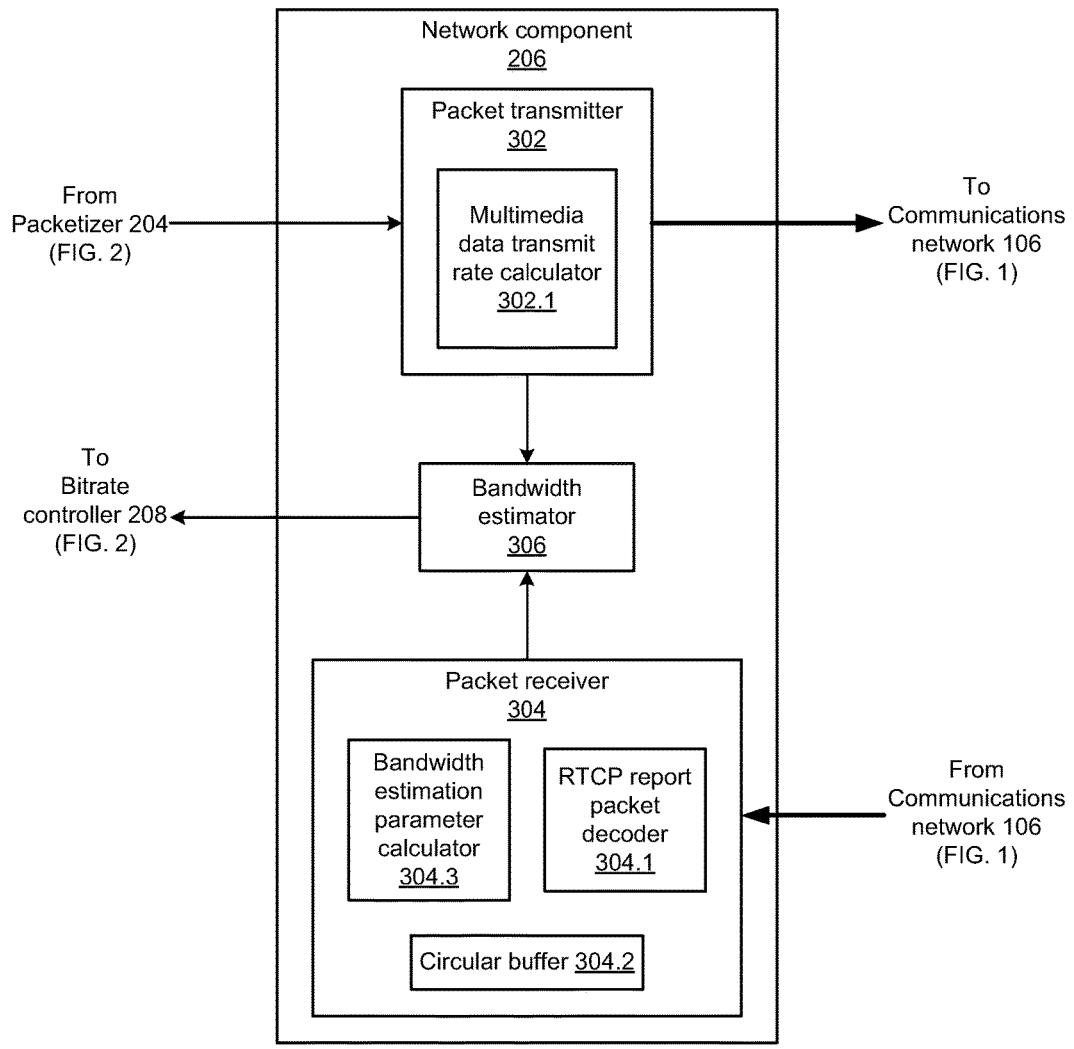
FIG. 3 is a block diagram of an exemplary network component included in the data sender of FIG. 1, in which the network component includes a bandwidth estimator for obtaining estimates of available bandwidths of the respective data receivers of FIG. 1.

FIG. 2 depicts a detailed view of the data sender 102 of FIG. 1. As shown in FIG. 2, the data sender 102 includes a video encoder 202, a packetizer 204, a network component 206 for obtaining estimates of available bandwidths of the respective data receivers 104.1-104.m (see FIG. 1), and a bitrate controller 208. FIG. 3 depicts a detailed view of the network component 206 of FIG. 2. As shown in FIG. 3, the network component 206 includes a packet transmitter 302, a packet receiver 304, and a bandwidth estimator 306. As further shown in FIG. 3, the packet transmitter 302 includes a multimedia data transmit rate calculator 302.1, and the packet receiver 304 includes an RTCP report packet decoder 304.1, a circular buffer 304.2, and a bandwidth estimation parameter calculator 304.3.

The system 100 of FIG. 1 is operative to perform transmissions of multimedia data based on the real-time transport protocol (RTP), and to monitor delivery of such multimedia data using the RTCP. For example, the data sender 102 can send such multimedia data to a respective data receiver 104.1, 104.2, . . . , or 104.m over the communications network 106 in the form of RTP packets (e.g., video, audio, and/or data RTP packets), and the respective data receiver 104.1, 104.2, . . . , or 104.m can provide reception quality feedback information to the data sender 102 over the communications network 106 in the form of RTCP report packets (e.g., RTCP sender report (SR) packets, RTCP receiver report (RR) packets).

Having sent one or more RTP packets to the respective data receiver 104.1, 104.2, . . . , or 104.m, the data sender 102 can receive, at the packet receiver 304 (see FIG. 3), one or more RTCP report packets containing reception quality feedback information, including packet loss and round trip delay information, from the respective data receiver 104.1, 104.2, . . . , or 104.m. The RTCP report packet decoder 304.1 decodes the RTCP report packets containing the reception quality feedback information, and the circular buffer 304.2 stores a history of such reception quality feedback information provided in the RTCP report packets. For example, the circular buffer 304.2 can store the reception quality feedback information provided by the data receiver 104.1, 104.2, . . . , or 104.m for a specified time period, and/or a specified number of RTCP report packets. Further, the RTCP report packets can be RTCP SR packets, and the reception quality feedback information provided in the RTCP SR packets can include, but is not limited to, the fraction lost (also referred to herein as the "fractionLost"), the cumulative number of packets lost (also referred to herein as the "cumuPktLostCnt"), the extended highest sequence number received (also referred to herein as the "extHighestSeqNum"), the last SR timestamp (also referred to herein as the "lastSRTxTime"), and the delay since last SR (also referred to herein as the "delaySinceLastSR"). Such reception quality feedback information is defined in RTP: A Transport Protocol for Real-Time Applications, copyright © The Internet Society, July 2003 (the "RTP document"), which is hereby incorporated herein by reference in its entirety. It is noted that the RTP document defines the fractionLost as the number of packets lost (also referred to herein as the "totalLostPktCnt") divided by the number of packets expected (also referred to herein as the "totalExpectedPktCnt").

Figure 4:
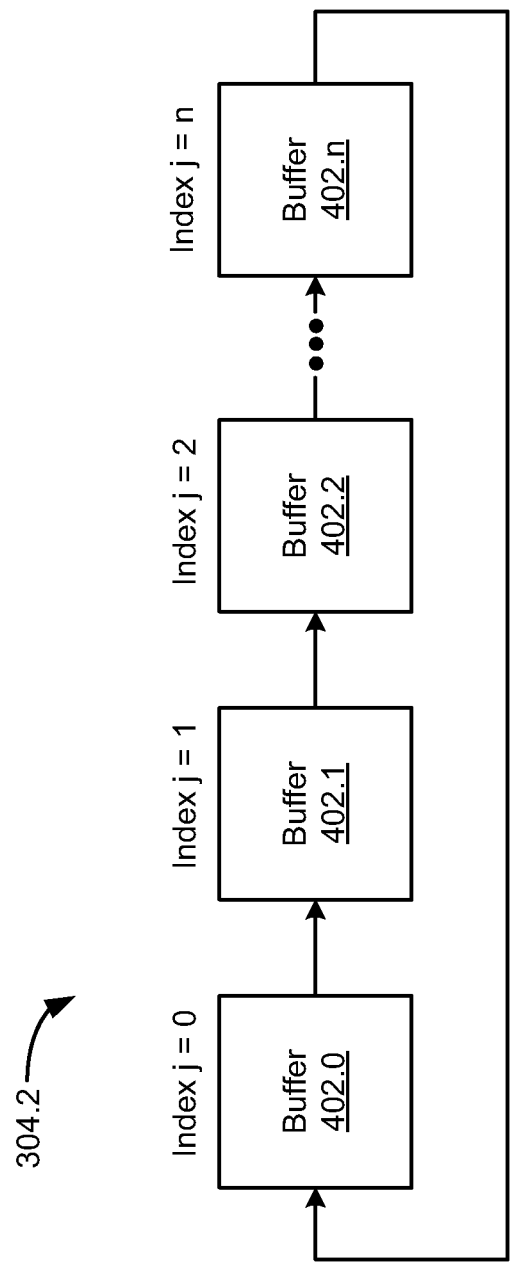
FIG. 4 is a block diagram of an exemplary circular buffer for storing reception quality feedback information, the circular buffer being included in the network component of FIG. 3.

FIG. 4 depicts a detailed view of the circular buffer 304.2 of FIG. 3. As shown in FIG. 4, the circular buffer 304.2 includes a plurality of buffers 402.0, 402.1, . . . , 402.n (the specific number of which can vary in accordance with the present application) for storing a history of reception quality feedback information, including a current buffer (e.g., the buffer 402.0, or any other one of the buffers 402.1, 402.2, . . . , 402.n) for storing the reception quality feedback information provided in an RTCP report packet most recently received at the data sender 102, and a series of prior buffers (e.g., the buffers 402.1, 402.2, . . . , 402.n, or any other series of the buffers 402.0, 402.1, . . . , 402.n) for storing the reception quality feedback information provided in a plurality of RTCP report packets previously received at the data sender. For example, the circular buffer 304.2 can include eight (8) buffers, namely, buffers 402.0, 402.1, 402.2, 402.3, 402.4, 402.5, 402.6, 402.7 (buffer index j=0, 1, 2, 3, 4, 5, 6, 7), or any other suitable number of buffers in accordance with the present application.

The bandwidth estimation parameter calculator 304.3 (see FIG. 3) is operative to calculate several bandwidth estimation parameters from the reception quality feedback information stored in the circular buffer 304.2. For example, the bandwidth estimation parameters can include, but are not limited to, a packet loss ratio (also referred to herein as the "PktLossRatio"), and a round trip delay (also referred to herein as the "curRoundTripDelay") between the data sender 102 and the respective data receiver 104.1, 104.2, . . . , or 104.m. The bandwidth estimation parameter calculator 304.3 is further operative to calculate a weighted average value of the PktLossRatio (also referred to herein as the "weightedAvgLossRatio"), and a weighted average value of the curRoundTripDelay (also referred to herein as the "weightedAvgRoundTripDelay"). The multimedia data transmit rate calculator 302.1 (see FIG. 3) is operative to calculate the multimedia data transmit rate (also referred to herein as the "txVideoBitrate") used by the data sender 102 to send the RTP packets to the data receiver 104.1, 104.2, . . . , or 104.m, and to subsequently calculate a weighted average value of the txVideoBitrate (also referred to herein as the "weightedAvgVideoBitrate"). Because a video data transmit rate is typically higher than a corresponding audio data transmit rate or control data transmit rate, the txVideoBitrate can be made to correspond to the video data transmit rate from the data sender 102 to the data receiver 104.1, 104.2, . . . , or 104.m. The bandwidth estimation parameter calculator 304.3 and the multimedia data transmit rate calculator 302.1 are operative to provide the bandwidth estimation parameters and the txVideoBitrate, respectively, to the bandwidth estimator 306 for use in obtaining an estimate of the available bandwidth of the data receiver 104.1, 104.2, . . . , or 104.m (such an estimate also referred to herein as the "newVideoBW").

The disclosed system 100 for dynamically adapting multimedia data transmit rates of data senders to available bandwidths of data receivers will be further understood with reference to the following illustrative example, as well as FIGS. 1-5. In this example, the data sender 102 (see FIG. 1) sends, via the packet transmitter 302 (see FIG. 3), one or more RTP packets to a respective data receiver 104.1, 104.2, . . . , or 104.m (see FIG. 1). Further, the data sender 102 subsequently receives, at the packet receiver 304 (see FIG. 3), one or more RTCP report packets containing reception quality feedback information, including packet loss and round trip delay information, from the respective data receiver 104.1, 104.2, . . . , or 104.m. As described herein, the RTCP report packets can be RTCP SR packets, and the reception quality feedback information provided in the RTCP SR packets can include the fractionLost, the cumuPktLostCnt, the extHighestSeqNum, the lastSRTxTime, and the delaySinceLastSR. As further described herein, the fractionLost is defined as the lostPktCnt divided by the expectedPktCnt.

The RTCP report packet decoder 304.1 (see FIG. 3) decodes the RTCP SR packets, and stores a history of the reception quality feedback information provided in the RTCP SR packets in the circular buffer 304.2 (see FIG. 3). Using the reception quality feedback information stored in the circular buffer 304.2, the bandwidth estimation parameter calculator 304.3 (see FIG. 3) calculates a plurality of bandwidth estimation parameters, including at least a PktLossRatio, a weightedAvgLossRatio, a curRoundTripDelay, and a weightedAvgRoundTripDelay.

For example, for a specified reception interval of the RTCP SR packets (also referred to herein as the "RTCP reception interval" or "RTCPPktDuration"), the PktLossRatio can be expressed in terms of the fractionLost, as follows:

$$\text{fractionLost} = (\text{lostPktCnt} \times 100)/\text{expectedPktCnt} \qquad (1)$$

in which "lostPktCnt" can be expressed as follows:

$$\text{lostPktCnt} = \text{cumuPktLostCnt} - \text{prevCumuPktLostCnt} \qquad (2)$$

and "expectedPktCnt" can be expressed as follows:

$$\text{expectedPktCnt} = \text{extHighestSeqNum} - \text{prevExtHighestSeqNum} \quad (3)$$

It is noted that, in equation (2), "cumuPktLostCnt" is the cumulative number of packets lost stored in a current buffer of the circular buffer 304.2, and "prevCumuPktLostCnt" is the previous cumulative number of packets lost stored in at least one prior buffer of the circular buffer 304.2. Further, in equation (3), "extHighestSeqNum" is the extended highest sequence number received stored in the current buffer of the circular buffer 304.2, and "prevExtHighestSeqNum" is the previous extended highest sequence number received stored in the prior buffer of the circular buffer 304.2.

Further, for the RTCP reception interval, the curRoundTripDelay can be expressed as follows:

$$\text{curRoundTripDelay} = \text{currentSRRxTime} - \text{lastSRTxTime} - \text{delaySinceLastSR} \quad (4)$$

in which "currentSRRxTime" is the timestamp of the RTCP SR packet most recently received at the data sender 102.

Figure 5:
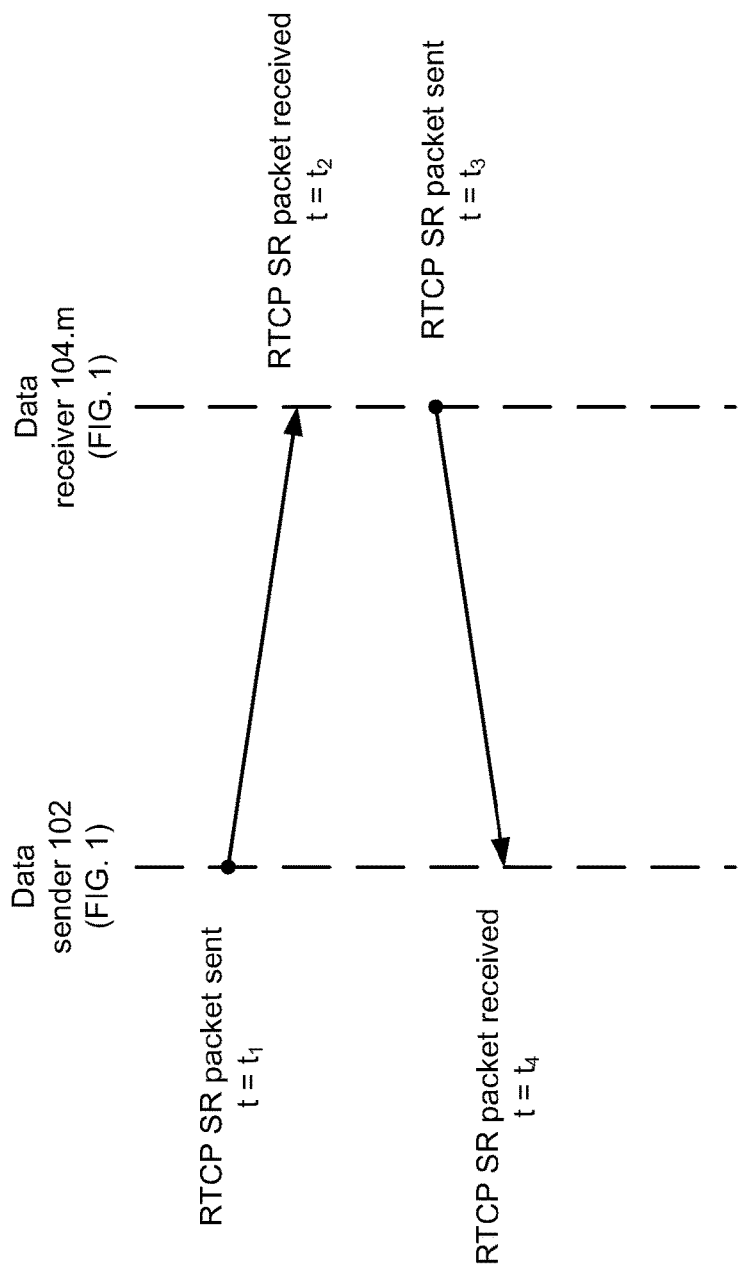
FIG. 5 is a diagram illustrating an exemplary exchange of reception quality feedback information between the multimedia data sender and a respective one of the data receivers of FIG. 1.
Figure 6:
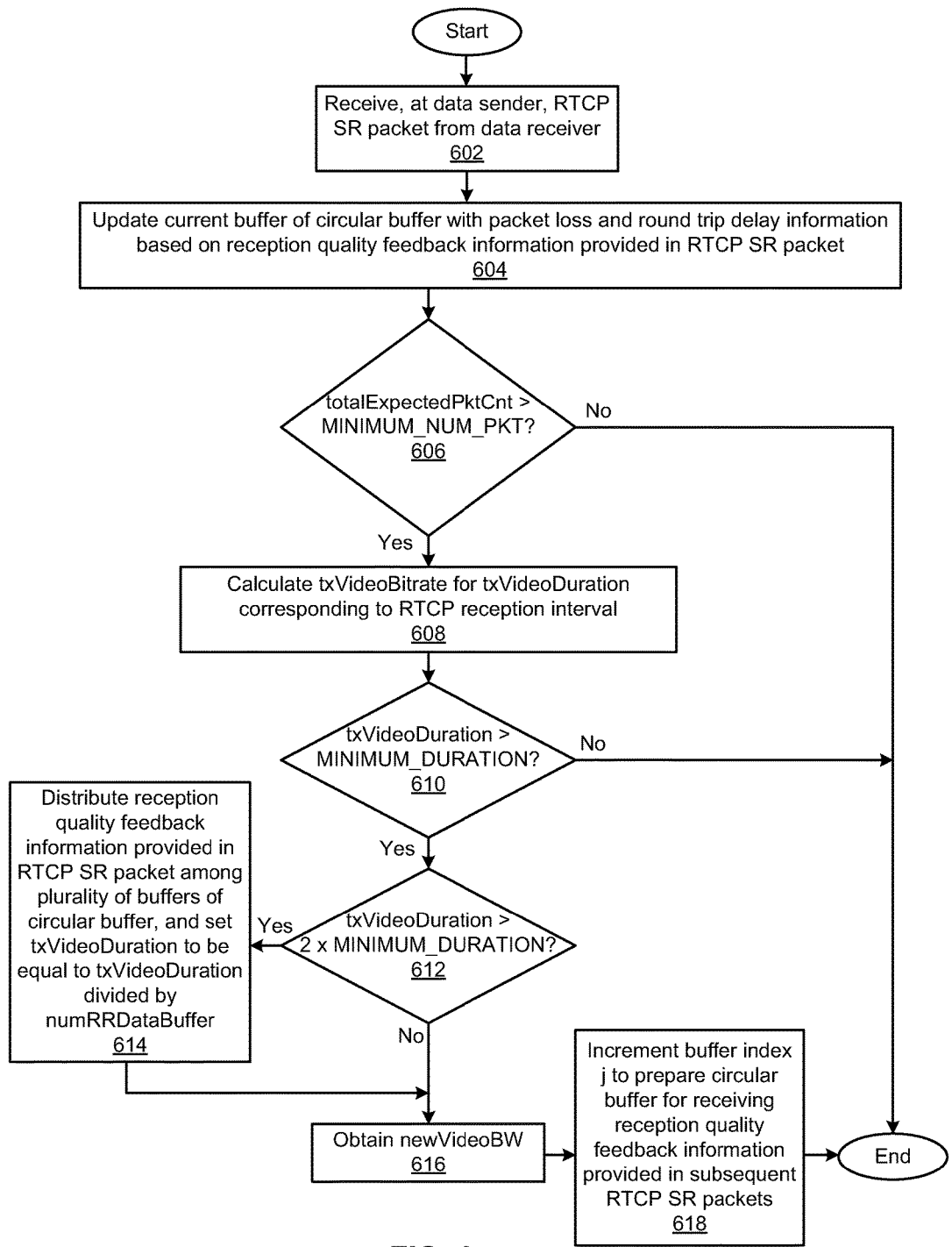
FIG. 6 is a flow diagram illustrating an exemplary method of updating reception quality feedback information stored in the circular buffer of FIG. 4.
Figure 7:
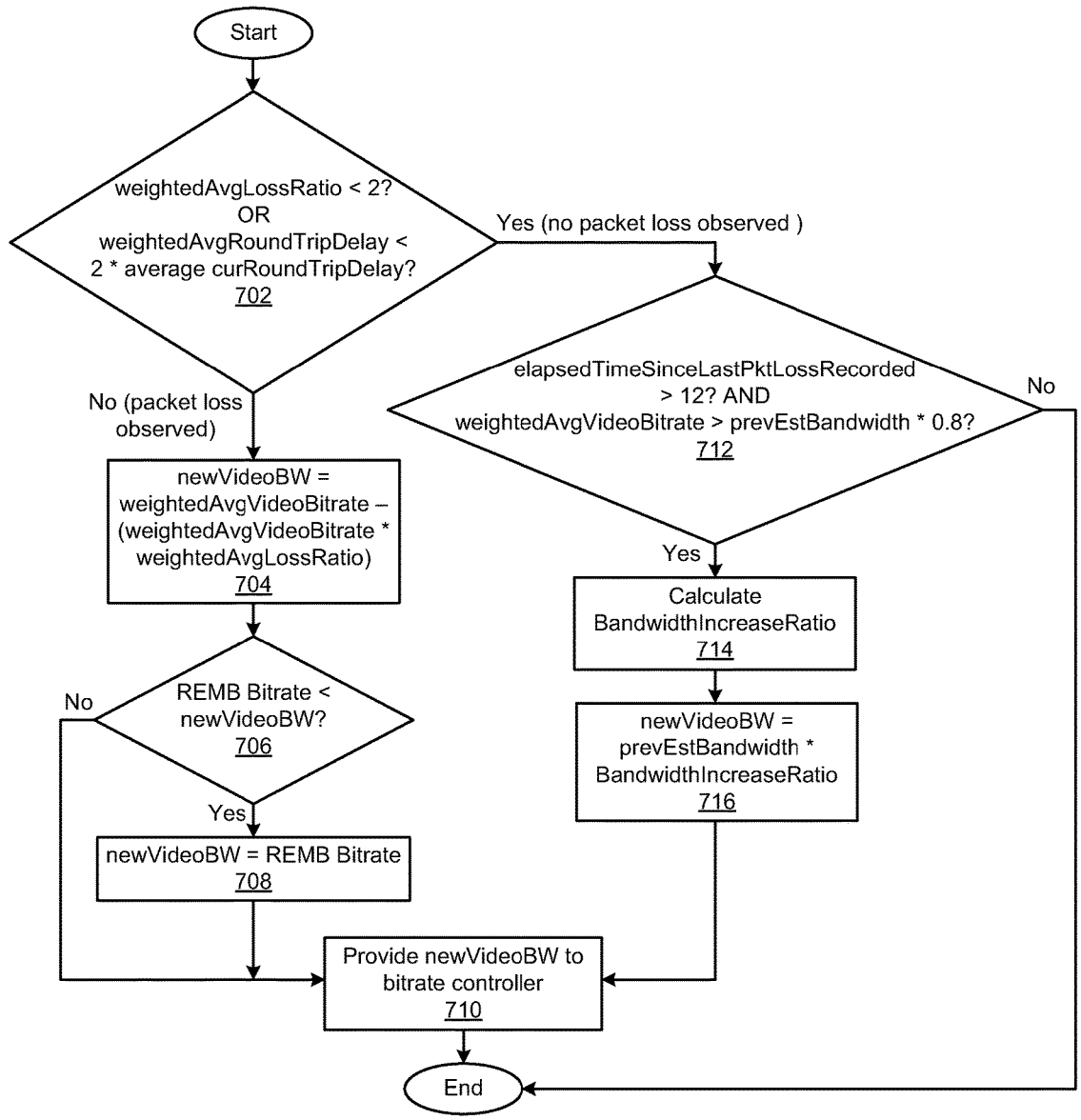
FIG. 7 is a flow diagram illustrating an exemplary method of obtaining an estimate of an available bandwidth of a data receiver by the bandwidth estimator of FIG. 3.

FIG. 5 illustrates an exemplary exchange of RTCP SR packets between the data sender 102 and the respective data receiver 104.1, 104.2, ..., or 104.m, illustrating the various time factors, i.e., currentSRRxTime, lastSRTxTime, and delaySinceLastSR, used in calculating the curRoundTripDelay (see equation (4)). With reference to FIG. 5, "$t=t_1$" corresponds to lastSRTxTime (see equation (4)), i.e., the time when the data sender 102 sends an RTCP SR packet to the data receiver 104.1, 104.2, ..., or 104.m, "$t=t_2$" corresponds to the time when the data receiver 104.1, 104.2, ..., or 104.m receives the RTCP SR packet from the data sender 102, "$t=t_3$" corresponds to the time when the data receiver 104.1, 104.2, ..., or 104.m sends an RTCP SR packet back to the data sender 102, and "$t=t_4$" corresponds to currentSRRxTime (see equation (4)), i.e., the time when the data sender 102 receives the RTCP SR packet from the data receiver 104.1, 104.2, ..., or 104.m. It is noted that the time difference "$t_3-t_2$" corresponds to delaySinceLastSR (see equation (4)).

It is further noted that, whenever the buffer index j of the circular buffer 304.2 is incremented, values of the totalExpectedPktCnt, the totalLostPktCnt, the fractionLost, and the curRoundTripDelay corresponding to the buffer pointed to by the buffer index j are each initialized to "0". Further, for each RTCP SR packet received at the data sender 102, the values of the totalExpectedPktCnt, the totalLostPktCnt, the fractionLost, and the curRoundTripDelay are updated, at the buffer index j, as follows:

$$\text{totalExpectedPktCnt} = \text{totalExpectedPktCnt} + \text{expectedPktCnt} \quad (5)$$

$$\text{totalLostPktCnt} = \text{totalLostPktCnt} + \text{lostPktCnt} \quad (6)$$

$$\text{fractionLost} = (\text{totalLostPktCn} \times 100)/\text{totalExpectedPktCnt} \quad (7)$$

$$\text{curRoundTripDelay} = \max(\text{curRoundTripDelay}, \text{currentSRRxTime} - \text{lastSRTxTime} - \text{delaySinceLastSR}) \quad (8)$$

It is noted that an average function, or any other suitable function, may be employed instead of the "max( ... )" function in equation (8).

In addition, the weightedAvgLossRatio and the weightedAvgRoundTripDelay can be expressed in terms of eight (8) predetermined weights $w_0, w_1, w_2, w_3, w_4, w_5, w_6, w_7$, which are applied to the reception quality feedback information stored in the eight (8) buffers 402.0, 402.1, 402.2, 402.3, 402.4, 402.5, 402.6, 402.7 included in the circular buffer 304.2. For example, a current buffer for storing the reception quality feedback information provided in an RTCP report packet most recently received at the data sender 102 can correspond to the buffer 402.7, and a series of prior buffers for storing the reception quality feedback information provided in a plurality of RTCP report packets previously received at the data sender 102 can correspond to the buffers 402.6, 402.5, 402.4, 402.3, 402.2, 402.1, 402.0. Further, the greatest predetermined weight can be applied to the most recent reception quality feedback information stored in the current buffer 402.7, while progressively lesser predetermined weights can be applied to the reception quality feedback information stored in the prior buffers 402.6, 402.5, 402.4, 402.3, 402.2, 402.1, 402.0.

For example, the predetermined weights $w_0, w_1, w_2, w_3, w_4, w_5, w_6, w_7$ can have the following values:

$$w_0=4, w_1=3, w_2=2, w_3=2, w_4=2, w_5=1, w_6=1, w_7=1 \quad (9)$$

It is noted that any other suitable values for the predetermined weights $w_0, w_1, w_2, w_3, w_4, w_5, w_6, w_7$ may be employed in accordance with the present application.

Using the predetermined weights $w_0, w_1, w_2, w_3, w_4, w_5, w_6, w_7$ (see, e.g., equations (9)), the weightedAvgLossRatio can be expressed as follows:

$$\text{weightedAvgLossRatio} = \frac{\sum_{i=0}^{7} w_i \times \text{fractionLost}[j-i]}{\sum_{i=0}^{7} w_i} \quad (10)$$

in which "fractionLost" can be determined in accordance with equation (1), and "j" is the index of the current buffer of the circular buffer 304.2.

Further, using the predetermined weights $w_0, w_1, w_2, w_3, w_4, w_5, w_6, w_7$ (see, e.g., equations (9)), the weightedAvgRoundTripDelay can be expressed as follows:

$$\text{weightedAvgRoundTripDelay} = \frac{\sum_{i=0}^{7} w_i \times \text{curRoundTripDelay}[j-i]}{\sum_{i=0}^{7} w_i} \quad (11)$$

in which "curRoundTripDelay" can be determined in accordance with equation (4), and "j" is the index of the current buffer of the circular buffer 304.2.

It is noted that the weightedAvgVideoBitrate can likewise be expressed as follows:

$$\text{weightedAvgVideoBitrate} = \frac{\sum_{i=0}^{7} w_i \times \text{txVideoBitrate}[j-i]}{\sum_{i=0}^{7} w_i} \quad (12)$$

in which "txVideoBitrate" can be calculated by the multimedia data transmit rate calculator 302.1 (see FIG. 3), and "j" is the index of the current buffer of the circular buffer 304.2.

Having calculated the fractionLost, the weightedAvgLossRatio, the curRoundTripDelay, and the weightedAvgRoundTripDelay, the bandwidth estimation parameter calculator 304.3 (see FIG. 3) determines whether the totalExpectedPktCnt is greater than a predetermined minimum number of packets (also referred to herein as the "MINIMUM_NUM_PKT"). For example, the MINIMUM_NUM_PKT can be equal to 32, or any other suitable value.

In the event the total ExpectedPktCnt is determined to be greater than the MINIMUM_NUM_PKT, the multimedia data transmit rate calculator 302.1 (see FIG. 3) calculates a video data transmit rate (i.e., the txVideoBitrate) for a time duration (also referred to herein as the "txVideoDuration") corresponding to the RTCP reception interval. For example, if the RTCP reception interval corresponds to a time duration between two RTCP SR packets with sequence numbers "p" and "p-q", respectively, then the multimedia data transmit rate calculator 302.1 can calculate the txVideoBitrate for a plurality of transmitted RTP packets with sequence numbers ranging from "x" to "y", in which x can be expressed as follows:

$$x = \text{extHighestSeqNum of RTCP SR packet}_{(p-q)} + 1 \quad (13)$$

and y can be expresses as follows:

$$y = \text{extHighestSeqNum of RTCP SR packet}_{(p)} \quad (14)$$

In this case, the time duration is equal to the difference in timestamps for the transmitted RTP packets with the sequence numbers x and y, as expressed in equations (13) and (14), respectively.

In addition, the bandwidth estimation parameter calculator 304.3 (see FIG. 3) determines whether the txVideoDuration is greater than the MINIMUM_DURATION, but less than about twice the MINIMUM DURATION. For example, the MINIMUM_DURATION can be equal to 1 second, or any other suitable time duration. In the event the txVideoDuration is determined to be greater than the MINIMUM_DURATION, but also less than about twice the MINIMUM DURATION, the bandwidth estimator 306 (see FIG. 3) proceeds toward obtaining a newVideoBW, using the calculated bandwidth estimation parameters, namely, the fractionLost, the weightedAvgLossRatio, the curRoundTripDelay, and the weightedAvgRoundTripDelay, as well as the calculated txVideoBitrate.

However, if the txVideoDuration is determined to be greater than about twice the MINIMUM_DURATION, then the packet receiver 304 (see FIG. 3) distributes the reception quality feedback information provided in the RTCP SR packets among the plurality of buffers 402.0-402.n (see FIG. 4) of the circular buffer 304.2, so as to assure that the weightedAvgLossRatio and the weightedAvgRoundTripDelay are calculated by the bandwidth estimation parameter calculator 304.3 using approximately the same quantity of reception quality feedback information. With regard to such a distribution of the reception quality feedback information among the plurality of buffers 402.0-402.n, the number of buffers (also referred to herein as the "numRRDataBuffer") employed in the circular buffer 304.2 can be determined as follows:

$$\text{numRRDataBuffer} = \text{txVideoDuration}/\text{MINIMUM\_DURATION} \quad (15)$$

Further, the total number of packets expected per buffer (also referred to herein as the "totalExpectedPktCntPerBuffer") can be expressed as follows:

$$\text{totalExpectedPktCntPerBuffer} = \text{totalExpectedPktCnt}/\text{numRRDataBuffer} \quad (16)$$

and the total number of packets lost per buffer (also referred to herein as the "totalLostPktCntPerBuffer") can be expressed as follows:

$$\text{totalLostPktCntPerBuffer} = \text{totalLostPktCnt}/\text{numRRDataBuffer} \quad (17)$$

The totalExpectedPktCnt, the totalLostPktCnt, the fractionLost, and the curRoundTripDelay corresponding to the all of the numRRDataBuffer buffers selected from the circular buffer 304.2 can then be expressed as follows:

for all of the numRRDataBuffer buffers (18)
{
totalExpectedPktCnt = totalExpectedPktCntPerBuffer
totalLostPktCnt = totalLostPktCntPerBuffer
fractionLost = fractionLost of the buffer prior to distribution
curRoundTripDelay = currentSRRxTime − lastSRTxTime − delaySinceLastSR
}

The bandwidth estimator 306 (see FIG. 3) then proceeds toward obtaining the newVideoBW, using the calculated bandwidth estimation parameters, namely, the fractionLost, the weightedAvgLossRatio, the curRoundTripDelay, and the weightedAvgRoundTripDelay, as well as the calculated txVideoBitrate. Once the newVideoBW is obtained, the buffer index j is incremented to prepare the circular buffer 304.2 for receiving reception quality feedback information provided in one or more subsequent RTCP SR packets.

An exemplary method of updating reception quality feedback information stored in the circular buffer 304.2 is described below with reference to FIGS. 1, 3, 4, and 6. As depicted in block 602 (see FIG. 6), the data sender 102 (see FIG. 1) receives an RTCP SR packet from the data receiver 104.1, 104.2, . . . , or 104.m (see FIG. 1). As depicted in block 604, the packet receiver 304 (see FIG. 3) updates a current buffer of the circular buffer 304.2 (see FIG. 3) with packet loss and round trip delay information, based on the reception quality feedback information provided in the RTCP SR packet, such reception quality feedback information including the totalExpectedPktCnt, the totalLostPktCnt, the fractionLost, and the curRoundTripDelay. As depicted in block 606, a determination is made as to whether the totalExpectedPktCnt is greater than the MINIMUM_NUM_PKT. In the event the totalExpectedPktCnt is not greater than the MINIMUM_NUM_PKT, the method ends. Otherwise, if the totalExpectedPktCnt is greater than the MINIMUM_NUM_PKT, then the multimedia data transmit rate calculator 302.1 (see FIG. 3) calculates the txVideoBitrate for the txVideoDuration corresponding to the RTCP reception interval, as depicted in block 608. As depicted in block 610, a determination is made as to whether the txVideoDuration is greater than the MINIMUM_DURATION. In the event the txVideoDuration is not greater than the MINIMUM_DURATION, the method ends. Otherwise, if the txVideoDuration is greater than the MINIMUM_DURATION, then a determination is made as to whether the txVideoDuration is greater than about twice the MINIMUM_DURATION, as depicted in block 612. In the event the txVideoDuration is not greater than about twice the MINIMUM_DURATION, the method proceeds from block 612 to block 616, in which the bandwidth estimator 306 (see FIG. 3) obtains the newVideoBW. Otherwise, if the txVideoDuration is greater than about twice the MINIMUM_DURATION, then the packet receiver 304 distributes the reception quality feedback information provided in the RTCP SR packet among the plurality of buffers 402.0-402.n (see FIG.

4) of the circular buffer 304.2, and sets the txVideoDuration to be equal to the txVideoDuration divided by the numRR-DataBuffer, as depicted in block 614. The method then proceeds from block 614 to block 616, in which the bandwidth estimator 306 obtains the newVideoBW. Once the newVideoBW is obtained in block 616, the buffer index j is incremented to prepare the circular buffer 304.2 for receiving reception quality feedback information provided in one or more subsequent RTCP SR packets, as depicted in block 618.

Upon proceeding toward obtaining the newVideoBW, the bandwidth estimator 306 can detect or otherwise determine whether there was any packet loss that was due to a limitation in the available bandwidth of the respective data receiver 104.1, 104.2, ..., or 104.m. For example, the bandwidth estimator 306 can conclude, ascertain, or otherwise determine that there was such packet loss if the weightedAvgRoundTripDelay (see equation (11)) is significantly greater than (e.g., greater than about twice) the average curRoundTripDelay, if the average fractionLost is greater than a predetermined fractionLost, and/or by any other suitable criteria. Further, the bandwidth estimator 306 can conclude, ascertain, or otherwise determine that there was no such packet loss if the weightedAvgLossRatio (see equation (10)) is less than about 2, or by any other suitable criteria.

In the event such packet loss is determined to be due to the limited available bandwidth of the data receiver 104.1, 104.2, ..., or 104.m (e.g., the weightedAvgRoundTripDelay is determined to be greater than about twice the average curRoundTripDelay, and/or the weightedAvgLossRatio is determined to be greater than about 2), the bandwidth estimator 306 can reduce the weightedAvgVideoBitrate by the product of the weightedAvgVideoBitrate and the weightedAvgLossRatio in order to ultimately reduce the newVideoBW, as follows:

$$newVideoBW = weightedAvgVideoBitrate - (weightedAvgVideoBitrate \times weightedAvgLossRatio) \quad (19)$$

Having obtained the newVideoBW, the bandwidth estimator 306 can compare a value of the newVideoBW with a value of the receiver estimated maximum bitrate (also referred to herein as the "REMB bitrate"). The REMB bitrate is defined in *RTCP message for Receiver Estimated Maximum Bitrate*, copyright © 2013 IETF Trust and the persons identified as the document authors, which is hereby incorporated herein by reference in its entirety. In response to the comparison of the newVideoBW and the REMB bitrate, the bandwidth estimator 306 can use the lesser of these two values as the newVideoBW. The bandwidth estimator 306 can then provide the newVideoBW to the bitrate controller 208.

Otherwise, if such packet loss is determined not to be due to the limited available bandwidth of the data receiver 104.1, 104.2, ..., or 104.m, then the bandwidth estimator 306 can increase the newVideoBW by a predetermined factor, $\gamma$ (also referred to herein as the "BandwidthIncreaseRatio"), taking into account whether or not there were no packet losses for more than a predetermined time period "N" (also referred to herein as the "elapsedTimeSinceLastPktLossRecorded"), and/or whether or not the weightedAvgVideoBitrate is greater than a predetermined percentage "M" of a prior estimate of the available bandwidth of the data receiver 104.1, 104.2, ..., or 104.m (such a prior estimate also referred to herein as the "prevEstBandwidth"). For example, the variables N and M can be set to 12 seconds and 80%, respectively, or any other suitable values. In this way, the data sender 102 can increase the txVideoBitrate so as to promptly enhance the multimedia QoE as channel conditions between the data sender 102 and the data receiver 104.1, 104.2, ..., or 104.m improve.

For example, the BandwidthIncreaseRatio, $\gamma$, can be expressed as follows:

$$\gamma = 1.0 + \beta \times (\alpha + (RTCPPktDuration/3.0)) \quad (20)$$

in which "$\alpha$" and "$\beta$" can be set to 0.7 and 0.02, respectively, or any other suitable values. In addition, the newVideoBW, increased by the BandwidthIncreaseRatio, $\gamma$ (see equation (20)), can be expressed as follows:

$$newVideoBW = \gamma \times prevEstBandwidth \quad (21)$$

Moreover, in order to more adaptively increase the newVideoBW, the bandwidth estimator 306 can increase the newVideoBW by a factor, $\phi$, taking into account a current estimate of the available bandwidth of the respective data receiver 104.1, 104.2, ..., or 104.m (such a current estimate also referred to herein as the "curEstBandwidth"), as well as a predetermined video data transmit rate for achieving an acceptable multimedia QoE (such a predetermined video data transmit rate also referred to herein as the "goodQualityBitrate").

For example, the factor, $\phi$, can be expressed as follows:

$$\phi = 1.0 + \beta \times (\alpha + RTCPPktDuration/\mu) \times ((\theta \times goodQualityBitrate/curEstBandwidth) - \omega) \quad (22)$$

in which "$\alpha$", "$\beta$", "$\mu$", "$\theta$", and "$\omega$" can be set to 0.75, 0.01, 4, 4, and 3, respectively, or any other suitable values. In addition, the newVideoBW, increased by the factor, $\phi$ (see equation (22)), can be expressed as follows:

$$newVideoBW = \phi \times prevEstBandwidth \quad (23)$$

For example, the bandwidth estimator 306 may employ the factor, $\phi$, in place of the BandwidthIncreaseRatio, $\gamma$, to increase the txVideoBitrate, thereby promptly enhancing the multimedia QoE as channel conditions improve.

An exemplary method of obtaining an estimate of an available bandwidth of a data receiver is described below with reference to FIGS. 1-3 and 7. As depicted in block 702 (see FIG. 7), a determination is made as to whether the weightedAvgLossRatio is less than about 2, or whether the weightedAvgRoundTripDelay is less than about twice the average curRoundTripDelay. In the event the weightedAvgLossRatio is not less than about 2, and the weightedAvgRoundTripDelay is not less than about twice the average curRoundTripDelay, the bandwidth estimator 306 (see FIG. 3) concludes, ascertains, or otherwise determines that there was packet loss due to a limitation in the available bandwidth of a respective data receiver 104.1, 104.2, ..., or 104.m (see FIG. 1). The method therefore proceeds from block 702 to block 704, in which the bandwidth estimator 306 reduces the weightedAvgVideoBitrate by the product of the weightedAvgVideoBitrate and the weightedAvgLossRatio, and uses the result as the newVideoBW. As depicted in block 706, a determination is made as to whether the REMB bitrate is less than the newVideoBW. In the event the REMB bitrate is determined to be less than the newVideoBW, the bandwidth estimator 306 uses the REMB bitrate as the newVideoBW, as depicted in block 708. The bandwidth estimator 306 can then provide the newVideoBW to the bitrate controller 208 (see FIG. 2), as depicted in block 710.

Otherwise, if the weightedAvgLossRatio is less than about 2, or the weightedAvgRoundTripDelay is less than about twice the average curRoundTripDelay, then the bandwidth estimator 306 (see FIG. 3) concludes, ascertains, or otherwise determines that there was no packet loss due to a limitation in the available bandwidth of a respective data receiver 104.1, 104.2, . . . , or 104.*m* (see FIG. 1). The method therefore proceeds from block 702 to block 712, in which a determination is made as to whether the elapsedTimeSinceLastPktLossRecorded is greater than about 12 seconds (thereby taking into account whether or not there were no packet losses for more than a predetermined time period), and whether the weightedAvgVideoBitrate is greater than the product of the prevEstBandwidth and about 0.8 (thereby taking into account whether or not the weightedAvgVideoBitrate is greater than a predetermined percentage of the prevEstBandwidth). In the event the elapsedTimeSinceLastPktLossRecorded is not greater than about 12 seconds, or the weightedAvgVideoBitrate is not greater than about 80% of the prevEstBandwidth, the method ends. Otherwise, if the elapsedTimeSinceLastPktLossRecorded is greater than about 12 seconds, and the weightedAvgVideoBitrate is greater than about 80% of the prevEstBandwidth, then the method proceeds from block 712 to block 714, in which the bandwidth estimator 306 calculates the BandwidthIncreaseRatio. As depicted in block 716, the bandwidth estimator 306 then multiplies the prevEstBandwidth by the BandwidthIncreaseRatio, and uses the result as the newVideoBW. The bandwidth estimator 306 can then provide the newVideoBW to the bitrate controller 208 (see FIG. 2), as depicted in block 710.

It is noted that, at least at some times, the bandwidth estimator 306 can adjust the newVideoBW prior to providing the newVideoBW to the bitrate controller 208, based on a current video data transmit rate (also referred to herein as the "curTargetBitrate"), and/or whether there were any packet losses (i.e., the fractionLost is greater than "zero"), such packet losses being indicated by the reception quality feedback information stored in the current buffer of the circular buffer 304.2. Such an adjustment of the newVideoBW can include taking about 90% of the newVideoBW, and determining whether the result is greater than about 95% of the curTargetBitrate while the fractionLost is greater than zero. In the event about 90% of the newVideoBW is determined to be greater than about 95% of the curTargetBitrate while the fractionLost is greater than zero, the bandwidth estimator 306 can take about 95% of the curTargetBitrate as the newVideoBW. In this way, the newVideoBW can be effectively adjusted downward while packet losses are being detected based on the most recent reception quality feedback information stored in the circular buffer 304.2.

Otherwise, if no packet losses were detected based on the most recent reception quality feedback information stored in the circular buffer 304.2, then the bandwidth estimator 306 can adjust the newVideoBW based on whether any packet losses were detected (i.e., the weightedAvgLossRatio is greater than "zero"), as indicated by the reception quality feedback information stored in the prior buffers of the circular buffer 304.2. Such an adjustment of the newVideoBW can include taking about 90% of the newVideoBW, and determining whether the result exceeds the curTargetBitrate by more than about 12% while the weightedAvgLossRatio is greater than zero. In the event about 90% of the newVideoBW is determined to exceed the curTargetBitrate by more than about 12% while the weightedAvgLossRatio is greater than zero, the bandwidth estimator 306 can take about 112% of the curTargetBitrate as the newVideoBW. In this way, the newVideoBW can be effectively adjusted downward while packet losses are being detected based on the prior or earlier reception quality feedback information stored in the circular buffer 304.2.

Figure 8:
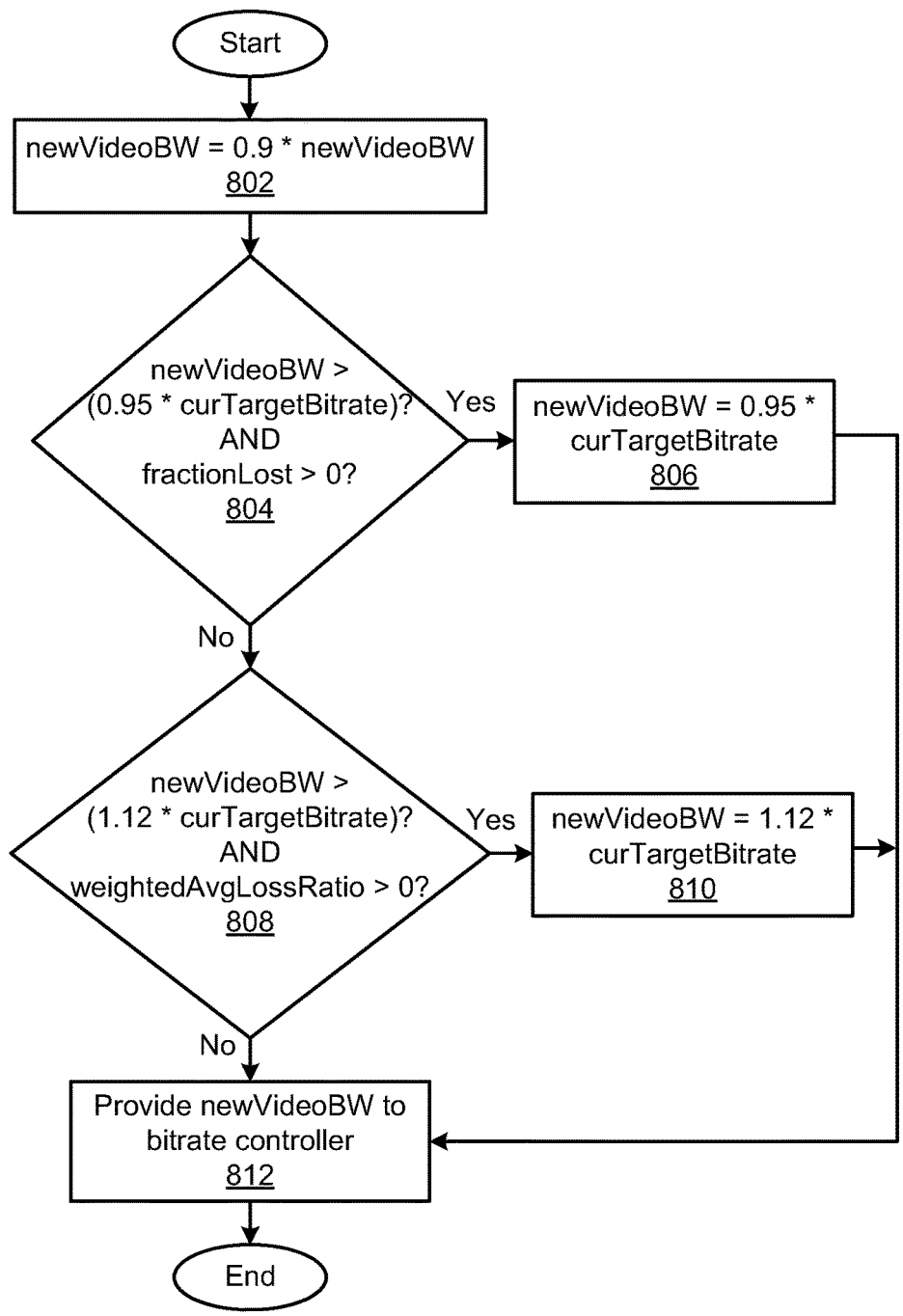
FIG. 8 is a flow diagram illustrating an exemplary method of adjusting an estimate of an available bandwidth of a data receiver by the bandwidth estimator of FIG. 3.

An exemplary method of adjusting an estimate of an available bandwidth of a data receiver is described below with reference to FIGS. 2, 3, and 8. As depicted in block 802, the bandwidth estimator 306 (see FIG. 3) multiplies the newVideoBW by about 0.9, and uses the result as the newVideoBW. As depicted in block 804, a determination is made as to whether the newVideoBW is greater than about 95% of the curTargetBitrate, and whether the fraction Lost (based on the most recent reception quality feedback information stored in the circular buffer 304.2) is greater than "zero". In the event the newVideoBW is greater than about 95% of the curTargetBitrate and the fraction Lost is greater than zero, about 95% of the curTargetBitrate is used as the newVideoBW, as depicted in block 806. Otherwise, if the newVideoBW is not greater than about 95% of the curTargetBitrate or the fraction Lost is not greater than zero, then a determination is made as to whether the newVideoBW is greater than about 112% of the curTargetBitrate, and whether the weightedAvgLossRatio (based on the earlier reception quality feedback information stored in the circular buffer 304.2) is greater than "zero", as depicted in block 808. In the event the newVideoBW is greater than about 112% of the curTargetBitrate and the weightedAvgLossRatio is greater than zero, about 112% of the curTargetBitrate is used as the newVideoBW, as depicted in block 810. The bandwidth estimator 306 then provides the newVideoBW to the bitrate controller 208 (see FIG. 2), as depicted in block 812. Otherwise, if the newVideoBW is not greater than about 112% of the curTargetBitrate or the weightedAvgLossRatio is not greater than zero, then the bandwidth estimator 306 provides the newVideoBW to the bitrate controller 208 without further adjustment, as depicted in block 812.

It is noted that, at least at some times, the bitrate controller 208 can adjust the targetBitrate based on one or more rate control characteristics of the video encoder 202, prior to providing the targetBitrate to the video encoder 202. For example, if, due to its rate control characteristics, the video encoder 202 tends to encode multimedia data bitstreams at a bitrate that is higher than the targetBitrate setting by a predetermined amount, then the bitrate controller 208 can adjust the targetBitrate downward by a predetermined factor (also referred to herein as the "codecAdjustFactor"), such as 0.95 or any other suitable value, thereby causing the video encoder 202 to encode the multimedia data bitstream at a bitrate that is closer to the desired targetBitrate. Likewise, if, due to its rate control characteristics, the video encoder 202 tends to encode multimedia data bitstreams at a bitrate that is lower than the targetBitrate setting by a predetermined amount, then the bitrate controller 208 can adjust the targetBitrate upward by a predetermined factor (i.e., the codecAdjustFactor), such as 1.05 or any other suitable value, thereby causing the video encoder 202 to encode the multimedia data bitstream at a bitrate that is closer to the desired targetBitrate.

Once the newVideoBW is received from the bandwidth estimator 306, the bitrate controller 208 determines whether the newVideoBW corresponds to a target bitrate (also referred to herein as the "targetBitrate") that is within about ±5% of the curTargetBitrate of the video encoder 202. In the event the targetBitrate is within about ±5% of the curTargetBitrate of the video encoder 202, the targetBitrate of the video encoder 202 remains unchanged. Otherwise, if the targetBitrate is not within about ±5% of the curTargetBitrate of the video encoder 202, then the bitrate controller 208 sets the targetBitrate to be equal to the newVideoBW. Further, the bitrate controller 208 provides the targetBitrate to the video encoder 202, which uses the targetBitrate for encoding a multimedia data bitstream.

Figure 9:
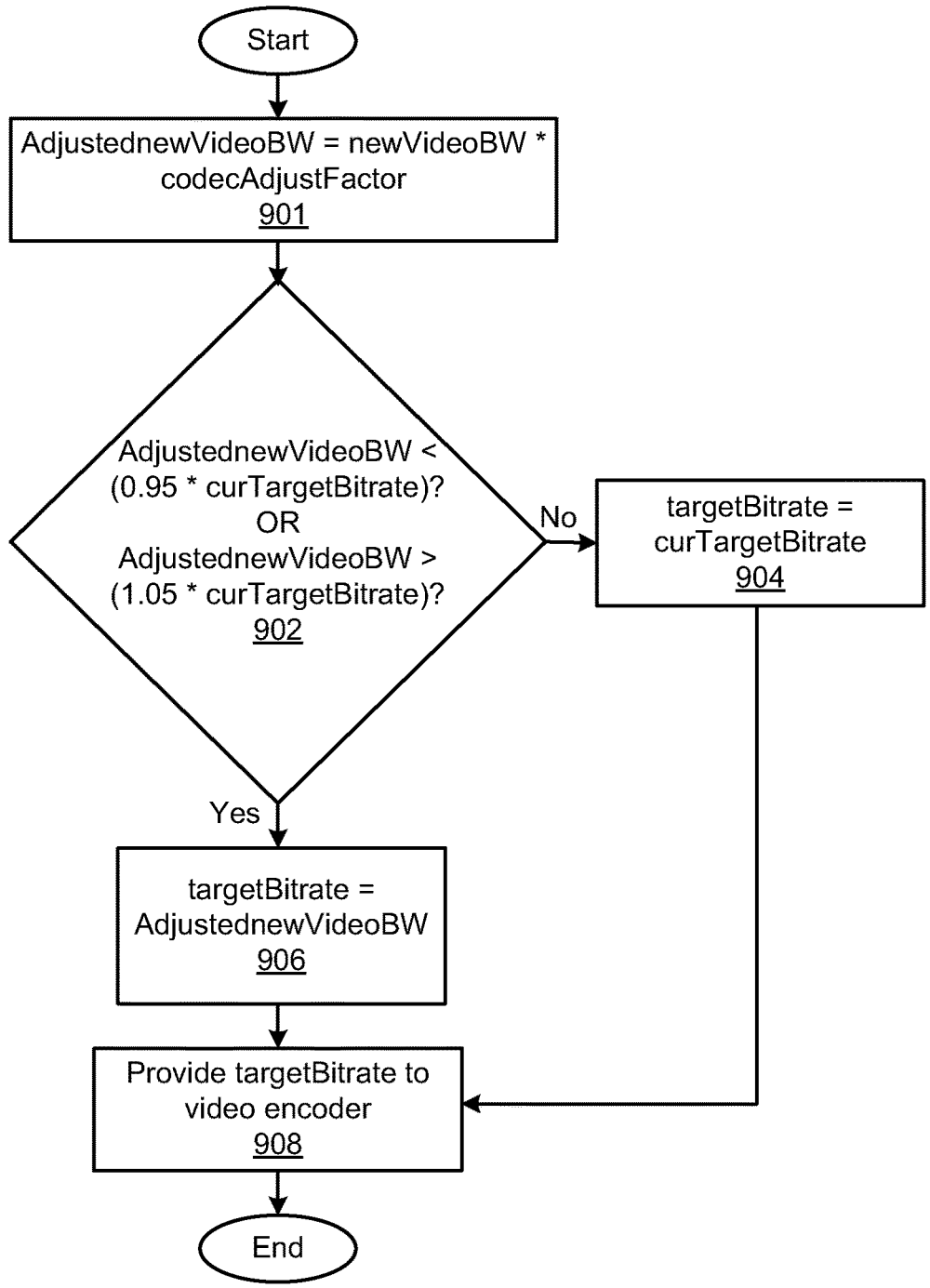
FIG. 9 is a flow diagram illustrating an exemplary method of setting a target bitrate of a video encoder by a bitrate controller included in the data sender of FIG. 1.

An exemplary method of setting a target bitrate of a video encoder is described below with reference to FIGS. 2 and 9. As depicted in block 901 (see FIG. 9), the newVideoBW is multiplied by the codecAdjustFactor (the product of the newVideoBW and the codecAdjustFactor also referred to herein as the "AdjustednewVideoBW"). A determination is then made as to whether the AdjustednewVideoBW corresponds to a targetBitrate that is less than about 95% of the curTargetBitrate, or whether the AdjustednewVideoBW corresponds to a targetBitrate that is greater than about 105% of the curTargetBitrate, as depicted in block 902. In the event the AdjustednewVideoBW is less than about 95% of the curTargetBitrate, or greater than about 105% of the curTargetBitrate, the AdjustednewVideoBW is used as the targetBitrate, as depicted in block 906. Otherwise, if the AdjustednewVideoBW is not less than about 95% of the curTargetBitrate, and not greater than about 105% of the curTargetBitrate, then the curTargetBitrate is used as the targetBitrate, as depicted in block 904. The bitrate controller 208 (see FIG. 2) then provides the targetBitrate to the video encoder 202, as depicted in block 908.

Having encoded a multimedia data bitstream using the targetBitrate, the video encoder 202 provides the encoded multimedia data bitstream to the packetizer 204. The packetizer 204, in turn, provides corresponding RTP packets to the packet transmitter 302 for subsequent transmission to the data receiver 104.1, 104.2, . . . , or 104.m over the communications network 106 at a video data transmit rate commensurate with the targetBitrate of the video encoder 202.

The operations herein described are purely exemplary and imply no particular order. Further, the operations can be used in any sequence when appropriate and can be partially used. With the above illustrative embodiments in mind, it should be understood that the invention could employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable media can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of dynamically adapting a multimedia data transmit rate of a multimedia data sender to an available bandwidth estimate of a multimedia data receiver, comprising:

receiving, at the multimedia data sender, a plurality of report packets from the multimedia data receiver, the respective report packets containing reception quality feedback information pertaining to at least a packet loss and a round trip delay between the multimedia data sender and the multimedia data receiver, the respective report packets being received at a report packet reception interval;

determining a value of a packet loss ratio and a value of the round trip delay from the reception quality feedback information contained in the respective report packets;

determining, from one or more of the value of the packet loss ratio and the value of the round trip delay, whether the packet loss was due to a limited available bandwidth of the multimedia data receiver;

determining a value of the multimedia data transmit rate of the multimedia data sender for a time duration corresponding to the report packet reception interval;

adjusting the available bandwidth estimate of the multimedia data receiver based at least on the value of the multimedia data transmit rate, the value of the packet loss ratio, and a result of the determining of whether the packet loss was due to the limited available bandwidth of the multimedia data receiver; and adapting the multimedia data transmit rate of the multimedia data sender to the available bandwidth estimate of the multimedia data receiver.

2. The method of claim 1 further comprising:

setting a target bitrate of the multimedia data sender so as not to exceed the estimated available bandwidth of the multimedia data receiver.

3. The method of claim 1 wherein the determining of the value of the multimedia data transmit rate includes determining a weighted average value of the multimedia data transmit rate.

4. The method of claim 3 further comprising:

determining a number of packets expected from the reception quality feedback information, and wherein the determining of the weighted average value of the multimedia data transmit rate includes determining the weighted average value of the multimedia data transmit rate in the event the number of packets expected exceeds a predetermined minimum number of packets.

5. The method of claim 4 wherein the adjusting of the available bandwidth estimate of the multimedia data receiver includes adjusting the available bandwidth estimate of the multimedia data receiver in the event the time duration exceeds a predetermined minimum time duration.

6. The method of claim 1 wherein the determining of the value of the packet loss ratio and the value of the round trip delay includes determining a weighted average value of the packet loss ratio and a weighted average value of the round trip delay.

7. The method of claim 6 further comprising:
storing a history of the reception quality feedback information in a circular buffer.

8. The method of claim 7 further comprising:
in the event the time duration exceeds a predetermined minimum time duration, distributing the reception quality feedback information among a plurality of buffers within the circular buffer so that the weighted average value of the packet loss ratio and the weighted average value of the round trip delay are determined from approximately the same quantity of the reception quality feedback information.

9. The method of claim 1 further comprising:
determining a receiver estimated maximum bitrate (REMB) from at least one real-time transport control protocol (RTCP) packet.

10. The method of claim 9 further comprising:
setting a bandwidth of the multimedia data sender to be substantially equal to the REMB in the event the REMB is less than the available bandwidth estimate of the multimedia data receiver.

11. The method of claim 1 further comprising:
detecting the packet loss due to the limited available bandwidth of the multimedia data receiver based on one or more of the value of the packet loss ratio and the value of the round trip delay.

12. The method of claim 11 wherein the adjusting of the available bandwidth estimate of the multimedia data receiver includes, having detected the packet loss, adjusting the available bandwidth estimate of the multimedia data receiver to the value of the multimedia data transmit rate reduced by an amount proportional to the value of the packet loss ratio.

13. The method of claim 11 wherein the adjusting of the available bandwidth estimate of the multimedia data receiver includes, having not detected the packet loss, increasing the available bandwidth estimate of the multimedia data receiver by a specific factor in the event no packet loss was detected for more than a predetermined time period.

14. The method of claim 13 wherein the increasing of the available bandwidth estimate of the multimedia data receiver includes increasing the available bandwidth estimate of the multimedia data receiver by the specific factor in the event a weighted average value of the multimedia data transmit rate is greater than a predetermined percentage of a previous available bandwidth estimate of the multimedia data receiver.

15. The method of claim 14 wherein the increasing of the available bandwidth estimate of the multimedia data receiver further includes increasing the available bandwidth estimate of the multimedia data receiver by the specific factor, the specific factor being based on one or more of a current available bandwidth estimate of the multimedia data receiver, and a predetermined video data transmit rate associated with an acceptable multimedia quality of experience (QoE).

16. The method of claim 11 wherein the reception quality feedback information includes recent reception quality feedback information and earlier reception quality feedback information, wherein the detecting of the packet loss includes detecting the packet loss based on the recent reception quality feedback information, and wherein the adjusting of the available bandwidth estimate includes, having detected the packet losses based on the recent reception quality feedback information, adjusting the available bandwidth estimate of the multimedia data receiver downward by a first predetermined amount.

17. The method of claim 11 wherein the reception quality feedback information further includes recent reception quality feedback information and earlier reception quality feedback information, wherein the detecting of the packet loss further includes detecting the packet loss based on the earlier reception quality feedback information, and wherein the adjusting of the available bandwidth estimate includes, having detected the packet losses based on the earlier reception quality feedback information, adjusting the available bandwidth estimate of the multimedia data receiver downward by a second predetermined amount.

18. The method of claim 1 wherein the adjusting of the available bandwidth estimate includes adjusting the available bandwidth estimate of the multimedia data receiver by a specific factor based on one or more rate control characteristics of the multimedia data sender.

19. The method of claim 1 wherein the determining of the value of the round trip delay includes determining a weighted average value of the round trip delay and an average value of the round trip delay, and wherein the determining of the value of the packet loss ratio includes determining an average value of the packet loss ratio.

20. The method of claim 19 wherein the determining of whether the packet loss was due to the limited available bandwidth of the multimedia data receiver includes one or more of (1) determining whether the weighted average value of the round trip delay is greater than approximately two times the average value of the round trip delay, and (2) determining whether the average value of the packet loss ratio is greater than a predetermined value.

21. The method of claim 1 wherein the determining of the value of the packet loss ratio includes determining a weighted average value of the packet loss ratio, wherein the determining of the value of the multimedia data transmit rate includes determining a weighted average value of the multimedia data transmit rate, and wherein the adjusting of the available bandwidth estimate of the multimedia data receiver includes, having determined that the packet loss was due to the limited available bandwidth of the multimedia data receiver, reducing the weighted average value of the multimedia data transmit rate by an amount proportional to the weighted average value of the packet loss ratio, and adjusting the available bandwidth estimate to the reduced weighted average value of the multimedia data transmit rate.

22. The method of claim 21 wherein the adjusting of the available bandwidth estimate of the multimedia data receiver further includes, having determined that the packet loss was not due to the limited available bandwidth of the multimedia data receiver, increasing the available bandwidth estimate by a predetermined amount in response to one or more of (1) no detection of packet losses for more than a predetermined time period, and (2) the weighted average value of the multimedia data transmit rate being greater than a predetermined percentage of a prior available bandwidth estimate of the multimedia data receiver.

23. A system for dynamically adapting a multimedia data transmit rate to an available bandwidth estimate of a communications device, comprising:
a memory; and
one or more processing elements coupled to the memory and executing one or more programs stored in the memory to implement:

a video encoder;
a packet receiver operative to receive a plurality of report packets from the communications device, the respective report packets containing reception quality feedback information pertaining to at least a packet loss and a round trip delay, the respective report packets being received at a report packet reception interval;
a bandwidth estimation parameter calculator operative to determine a value of a packet loss ratio and a value of the round trip delay from the reception quality feedback information contained in the respective report packets;
a multimedia data transmit rate calculator operative to determine a value of the multimedia data transmit rate for a time duration corresponding to the report packet reception interval;
a bandwidth estimator operative to determine, from one or more of the value of the packet loss ratio and the value of the round trip delay, whether the packet loss was due to a limited available bandwidth of the communications device, and to adjust the available bandwidth estimate of the communications device based at least on the value of the multimedia data transmit rate, the value of the packet loss ratio, and a result of determining whether the packet loss was due to the limited available bandwidth of the communications device; and
a bitrate controller operative to adapt the multimedia data transmit rate to the available bandwidth estimate of the communications device.

24. The system of claim 23 wherein the bitrate controller is further operative to set a target bitrate of the video encoder so as not to exceed the available bandwidth estimate of the communications device.

25. The system of claim 23 wherein the bandwidth estimator is further operative to detect the packet loss due to the limited available bandwidth of the communications device based on one or more of the value of the packet loss ratio and the value of the round trip delay.

26. The system of claim 25 wherein the bandwidth estimator is further operative, having detected the packet loss, to adjust the available bandwidth estimate of the communications device to the value of the multimedia data transmit rate reduced by an amount proportional to the value of the packet loss ratio.

27. The system of claim 23 wherein the multimedia data transmit rate calculator is further operative to determine a weighted average value of the multimedia data transmit rate.

28. The system of claim 27 wherein the bandwidth estimation parameter calculator is further operative to determine a number of packets expected from the reception quality feedback information, and wherein the multimedia data transmit rate calculator is further operative to determine the weighted average value of the multimedia data transmit rate in the event the number of packets expected exceeds a predetermined minimum number of packets.

29. The system of claim 28 wherein the bandwidth estimator is further operative to adjust the available bandwidth estimate of the communications device in the event the time duration exceeds a first predetermined minimum time duration.

30. The system of claim 23 wherein the bandwidth estimation parameter calculator is further operative to determine a weighted average value of the packet loss ratio and a weighted average value of the round trip delay.

31. The system of claim 30 further comprising a circular buffer, wherein the one or more processing elements are coupled to the circular buffer, and wherein the circular buffer is operative to store a history of the reception quality feedback information.

32. The system of claim 31 wherein the circular buffer is further operative, in the event the time duration exceeds a second predetermined minimum time duration, to store the reception quality feedback information distributed among a plurality of buffers so that the weighted average value of the packet loss ratio and the weighted average value of the round trip delay are determined from approximately the same quantity of the reception quality feedback information.

33. A network component, comprising:
a memory; and
one or more processing elements coupled to the memory and executing one or more programs stored in the memory to implement:
a packet receiver operative to receive a plurality of report packets from a communications device, the respective report packets containing reception quality feedback information pertaining to at least a packet loss and a round trip delay between a multimedia data sender and a multimedia data receiver, the respective report packets being received at a report packet reception interval;
a bandwidth estimation parameter calculator operative to determine a value of a packet loss ratio and a value of the round trip delay from the reception quality feedback information contained in the respective report packets;
a multimedia data transmit rate calculator operative to determine a value of a multimedia data transmit rate of the multimedia data sender for a time duration corresponding to the report packet reception interval; and
a bandwidth estimator operative to determine, from one or more of the value of the packet loss ratio and the value of the round trip delay, whether the packet loss was due to a limited available bandwidth of the multimedia data receiver, and to adjust an available bandwidth estimate of the communications device based at least on the value of the multimedia data transmit rate, the value of the packet loss ratio, and a result of determining whether the packet loss was due to the limited available bandwidth of the multimedia data receiver.

34. The network component of claim 33 wherein the bandwidth estimation parameter calculator is further operative to determine a weighted average value of the packet loss ratio and a weighted average value of the round trip delay.

35. The network component of claim 34 further comprising a circular buffer, wherein the one or more processing elements are coupled to the circular buffer, and wherein the circular buffer is operative to store a history of the reception quality feedback information.

36. The network component of claim 35 wherein the circular buffer is further operative, in the event the time duration exceeds a predetermined minimum time duration, to store the reception quality feedback information distributed among a plurality of buffers so that the weighted average value of the packet loss ratio and the weighted average value of the round trip delay are determined from approximately the same quantity of the reception quality feedback information.

37. The network component of claim 33 wherein the bandwidth estimator is further operative to detect the packet loss due to the limited available bandwidth of the communications device based on one or more of the value of the packet loss ratio and the value of the round trip delay.

38. The network component of claim 37 wherein the bandwidth estimator is further operative, having not detected the packet loss, to increase the available bandwidth estimate of the communications device by a specific factor in the event no packet loss was detected for more than a predetermined time period.

39. The network component of claim 38 wherein the bandwidth estimator is further operative to increase the available bandwidth estimate of the communications device by the specific factor in the event the value of the multimedia data transmit rate is greater than a predetermined percentage of a previous available bandwidth estimate of the communications device.

40. The network component of claim 39 wherein the bandwidth estimator is further operative to increase the available bandwidth estimate of the communications device by the specific factor, the specific factor being based on one or more of a current available bandwidth estimate of the communications device, and a predetermined video data transmit rate associated with an acceptable multimedia quality of experience (QoE).

41. The network component of claim 37 wherein the reception quality feedback information includes recent reception quality feedback information and earlier reception quality feedback information, wherein the bandwidth estimator is further operative to detect the packet loss based on the recent reception quality feedback information, and, having detected the packet losses based on the recent reception quality feedback information, to adjust the available bandwidth estimate of the communications device downward by a first predetermined amount.

42. The network component of claim 37 wherein the reception quality feedback information further includes recent reception quality feedback information and earlier reception quality feedback information, wherein the bandwidth estimator is further operative to detect the packet loss based on the earlier reception quality feedback information, and, having detected the packet losses based on the earlier reception quality feedback information, to adjust the available bandwidth estimate of the multimedia data receiver downward by a second predetermined amount.

43. The network component of claim 33 wherein the bandwidth estimator is further operative to adjust the available bandwidth estimate of the multimedia data receiver by a specific factor based on one or more characteristics of a rate control function.

* * * * *